US010545064B2

(12) United States Patent
Petrarca et al.

(10) Patent No.: US 10,545,064 B2
(45) Date of Patent: Jan. 28, 2020

(54) INTEGRATED PRESSURE AND TEMPERATURE SENSOR

(71) Applicant: Sensata Technologies, Inc., Attleboro, MA (US)

(72) Inventors: Neil Petrarca, Warwick, RI (US); Edwin Vonk, WK Enschede (NL)

(73) Assignee: Sensata Technologies, Inc., Attleboro, MA (US)

( * ) Notice: Subject to any disclaimer, the term of this patent is extended or adjusted under 35 U.S.C. 154(b) by 226 days.

(21) Appl. No.: 15/586,627

(22) Filed: May 4, 2017

(65) Prior Publication Data
US 2018/0321104 A1    Nov. 8, 2018

(51) Int. Cl.
| *G01K 7/14* | (2006.01) |
| *G01L 19/00* | (2006.01) |
| *G01K 7/22* | (2006.01) |
| *G01K 13/02* | (2006.01) |
| *G01L 9/00* | (2006.01) |

(52) U.S. Cl.
CPC ............ *G01L 19/0092* (2013.01); *G01K 7/22* (2013.01); *G01K 13/02* (2013.01); *G01L 9/0051* (2013.01); *G01K 2013/026* (2013.01)

(58) Field of Classification Search
CPC .......... G01K 13/02; G01K 13/00; G01K 1/14; G01K 2013/024; G01K 15/005; G01K 2013/026; G01K 17/00; G01L 19/0092; G01N 15/0826
USPC .......................... 374/143, 148, 147, 163, 185
See application file for complete search history.

(56) References Cited

U.S. PATENT DOCUMENTS

| 2,858,220 | A | * | 10/1958 | Battiste | .................... A21D 8/06 |
| | | | | | 426/128 |
| 3,719,980 | A | * | 3/1973 | Van Bussel | ............. F16H 55/44 |
| | | | | | 29/509 |
| 4,131,088 | A | | 12/1978 | Reddy | |
| 4,287,772 | A | | 9/1981 | Mounteer et al. | |
| 4,347,745 | A | | 9/1982 | Singh | |
| 4,400,681 | A | | 8/1983 | Brown et al. | |
| 4,771,427 | A | | 9/1988 | Tulpule et al. | |

(Continued)

FOREIGN PATENT DOCUMENTS

| CN | 103454032 A | 12/2013 |
| DE | 4234289 C1 | 11/1993 |

(Continued)

OTHER PUBLICATIONS

UK Search Report for Patent Application No. G61806265.3 dated Oct. 15, 2018, 4 pages.

*Primary Examiner* — Gail Kaplan Verbitsky
(74) *Attorney, Agent, or Firm* — Burns & Levinson, LLP.; Joseph M. Maraia; Daniel J. McGrath

(57) ABSTRACT

A device for sensing pressure and temperature in a fluid environment includes a cover defining an interior. A thermistor tube is positioned at least partially within the interior, the thermistor tube extending substantially along a longitudinal axis. A port body is also positioned at least partially within the interior, the port body forming a channel which extends along the longitudinal axis for receiving a fluid from the fluid environment. A diaphragm is affixed within the port body. The diaphragm has a first surface exposed to the fluid within the channel and a second surface sealed from the channel.

19 Claims, 10 Drawing Sheets

(56) References Cited

U.S. PATENT DOCUMENTS

| | | | |
|---|---|---|---|
| 4,825,876 A | 5/1989 | Beard | |
| 4,888,662 A | 12/1989 | Bishop | |
| 4,903,164 A | 2/1990 | Bishop et al. | |
| 5,060,108 A | 10/1991 | Baker et al. | |
| 5,070,706 A * | 12/1991 | Waters | F17C 13/02 |
| | | | 374/143 |
| 5,101,659 A | 4/1992 | Takeuchi | |
| 5,101,665 A | 4/1992 | Mizuno | |
| 5,144,843 A | 9/1992 | Tamura et al. | |
| 5,173,766 A | 12/1992 | Long et al. | |
| 5,181,417 A | 1/1993 | Nishida et al. | |
| 5,184,107 A | 2/1993 | Maurer | |
| 5,184,515 A | 2/1993 | Terry et al. | |
| 5,209,121 A | 5/1993 | Hafner | |
| 5,222,397 A | 6/1993 | Kodama | |
| 5,231,301 A | 7/1993 | Peterson et al. | |
| 5,284,107 A | 2/1994 | Milne et al. | |
| 5,331,857 A | 7/1994 | Levine et al. | |
| 5,349,865 A | 9/1994 | Kavli et al. | |
| 5,425,371 A | 6/1995 | Mischenko | |
| 5,448,444 A | 9/1995 | Provenzano et al. | |
| 5,457,988 A | 10/1995 | Delatorre | |
| 5,587,535 A | 12/1996 | Sasaki et al. | |
| 5,625,151 A | 4/1997 | Yamaguchi | |
| 5,629,486 A | 5/1997 | Viduya et al. | |
| 5,665,921 A | 9/1997 | Gerst et al. | |
| 5,741,975 A | 4/1998 | Vaughn, II et al. | |
| 5,802,912 A | 9/1998 | Pitzer et al. | |
| 5,866,822 A | 2/1999 | Willig | |
| 5,869,766 A | 2/1999 | Cucci et al. | |
| 6,003,379 A * | 12/1999 | Ichikawa | G01L 19/0092 |
| | | | 73/708 |
| 6,033,544 A | 3/2000 | Demers et al. | |
| 6,050,145 A | 4/2000 | Olson et al. | |
| 6,070,883 A | 6/2000 | Marto | |
| 6,119,524 A | 9/2000 | Kobold | |
| 6,204,594 B1 | 3/2001 | Ingham | |
| 6,351,998 B1 | 3/2002 | Hohnstadt et al. | |
| 6,389,903 B1 | 5/2002 | Oba et al. | |
| 6,411,038 B2 | 6/2002 | Murai et al. | |
| 6,439,058 B1 | 8/2002 | Aratani et al. | |
| 6,453,747 B1 | 9/2002 | Weise et al. | |
| 6,487,911 B1 | 12/2002 | Frackelton et al. | |
| 6,536,287 B2 | 3/2003 | Beekhuizen et al. | |
| 6,539,787 B1 | 4/2003 | Murai et al. | |
| 6,568,276 B1 | 5/2003 | Ciminelli | |
| 6,700,174 B1 | 3/2004 | Miu et al. | |
| 6,715,357 B2 | 4/2004 | Ishiguro et al. | |
| RE38,557 E | 7/2004 | Englund et al. | |
| 6,763,724 B2 | 7/2004 | DiPaola et al. | |
| 6,813,952 B2 * | 11/2004 | Yamashita | G01K 7/18 |
| | | | 374/201 |
| 6,876,943 B2 | 4/2005 | Wegerich | |
| 6,879,904 B2 * | 4/2005 | Muto | F02D 41/0072 |
| | | | 374/E7.042 |
| 6,945,118 B2 | 9/2005 | Maitland, Jr. et al. | |
| 6,952,042 B2 | 10/2005 | Stratton et al. | |
| 7,021,147 B1 | 1/2006 | Subramanian | |
| 7,000,478 B1 * | 2/2006 | Zwollo | G01K 1/08 |
| | | | 374/E1.011 |
| 7,032,456 B1 | 4/2006 | Amin | |
| 7,114,396 B2 | 10/2006 | Oda et al. | |
| 7,197,937 B2 | 4/2007 | Amore et al. | |
| 7,207,214 B1 | 4/2007 | Wlodarczyk | |
| 7,302,855 B2 | 12/2007 | Oda | |
| 7,316,164 B2 | 1/2008 | Toyoda et al. | |
| 7,383,737 B2 | 6/2008 | Lin et al. | |
| 7,412,894 B2 | 8/2008 | Ueyanagi et al. | |
| 7,518,234 B1 | 4/2009 | Okojie | |
| 7,555,957 B2 | 7/2009 | Toyoda | |
| 7,570,065 B2 | 8/2009 | Harish et al. | |
| 7,578,194 B1 | 8/2009 | Hadjiloucas et al. | |
| 7,726,197 B2 | 6/2010 | Selvan et al. | |
| 7,739,922 B2 | 6/2010 | Inamori | |
| 7,775,119 B1 | 8/2010 | Suminto et al. | |
| 8,024,978 B2 | 9/2011 | Khemet et al. | |
| 8,056,752 B2 | 11/2011 | Carnevali | |
| 8,104,357 B2 | 1/2012 | Schlitzkus et al. | |
| 8,129,624 B2 | 3/2012 | Willner et al. | |
| 8,156,816 B2 | 4/2012 | Willner et al. | |
| 8,164,007 B2 | 4/2012 | Speldrich et al. | |
| 8,215,176 B2 | 7/2012 | Ding et al. | |
| 8,250,909 B2 | 8/2012 | Kern et al. | |
| 8,297,115 B2 | 10/2012 | Borgers et al. | |
| 8,429,956 B2 | 4/2013 | Borgers et al. | |
| 8,516,897 B1 | 8/2013 | Jones et al. | |
| 8,627,559 B2 | 1/2014 | Suminto et al. | |
| 8,671,767 B2 | 3/2014 | Kaiser et al. | |
| 8,950,247 B2 | 2/2015 | Borgers et al. | |
| 8,984,949 B2 | 3/2015 | Staiger et al. | |
| 9,003,897 B2 | 4/2015 | Wade et al. | |
| 9,046,436 B2 | 6/2015 | Schlitzkus et al. | |
| 9,063,033 B2 | 6/2015 | Mayer et al. | |
| 9,606,010 B2 * | 3/2017 | Kaiser | G01K 13/02 |
| 9,709,461 B2 * | 7/2017 | Lenferink | G01K 1/14 |
| 9,841,335 B2 * | 12/2017 | Rueth | G01L 9/00 |
| 10,067,106 B2 * | 9/2018 | Yonezu | F01N 13/008 |
| 2001/0015402 A1 | 8/2001 | Murai et al. | |
| 2001/0039837 A1 | 11/2001 | Tanizawa et al. | |
| 2002/0029639 A1 | 3/2002 | Wagner et al. | |
| 2002/0073533 A1 | 6/2002 | Park | |
| 2002/0100948 A1 | 8/2002 | Yoshihara et al. | |
| 2003/0033884 A1 | 2/2003 | Beekhuizen et al. | |
| 2003/0150275 A1 | 8/2003 | Wagner et al. | |
| 2004/0007073 A1 | 1/2004 | Weise | |
| 2004/0007074 A1 | 1/2004 | DiPaola et al. | |
| 2004/0007075 A1 | 1/2004 | Ishiguro et al. | |
| 2004/0015282 A1 | 1/2004 | Babala et al. | |
| 2004/0020300 A1 | 2/2004 | Boehler et al. | |
| 2004/0132900 A1 | 7/2004 | Sachdev et al. | |
| 2004/0146719 A1 | 7/2004 | Baney et al. | |
| 2004/0147140 A1 | 7/2004 | Fan et al. | |
| 2004/0200286 A1 | 10/2004 | Mast | |
| 2005/0011273 A1 | 1/2005 | Sasaki et al. | |
| 2005/0103111 A1 | 5/2005 | Imai et al. | |
| 2005/0210990 A1 * | 9/2005 | Hayashi | G01K 7/22 |
| | | | 73/708 |
| 2005/0252300 A1 | 11/2005 | Miller | |
| 2006/0000289 A1 | 1/2006 | Jonsson | |
| 2006/0042393 A1 | 3/2006 | Kaneko et al. | |
| 2006/0042394 A1 | 3/2006 | Kosh et al. | |
| 2006/0042395 A1 | 3/2006 | Lepine et al. | |
| 2006/0053894 A1 | 3/2006 | Kunda et al. | |
| 2006/0090566 A1 | 5/2006 | Oda | |
| 2006/0123887 A1 | 6/2006 | Dordet | |
| 2006/0214202 A1 | 9/2006 | Zorich et al. | |
| 2006/0278012 A1 | 12/2006 | Fujimoto et al. | |
| 2007/0121701 A1 * | 5/2007 | Gennissen | G01K 13/02 |
| | | | 374/143 |
| 2007/0148788 A1 | 6/2007 | Hsieh et al. | |
| 2007/0154631 A1 | 7/2007 | Sachdev et al. | |
| 2007/0202628 A1 | 8/2007 | Wuertz | |
| 2007/0205776 A1 | 9/2007 | Harish et al. | |
| 2008/0148860 A1 | 6/2008 | Murakami et al. | |
| 2008/0222884 A1 | 9/2008 | Bradley et al. | |
| 2008/0262584 A1 | 10/2008 | Bottomley et al. | |
| 2009/0071260 A1 | 3/2009 | Speldrich | |
| 2009/0075529 A1 | 3/2009 | Johnston et al. | |
| 2009/0282926 A1 | 11/2009 | Hauer et al. | |
| 2009/0315864 A1 | 12/2009 | Silverbrook et al. | |
| 2009/0320576 A1 | 12/2009 | Borgers et al. | |
| 2010/0052578 A1 | 3/2010 | Kim | |
| 2010/0192696 A1 | 8/2010 | Schlitzkus et al. | |
| 2010/0219487 A1 | 9/2010 | Donis | |
| 2010/0239109 A1 | 9/2010 | Lutz et al. | |
| 2010/0267291 A1 | 10/2010 | Chabineau-Lovgren et al. | |
| 2010/0281994 A1 | 11/2010 | Brown et al. | |
| 2011/0088480 A1 | 4/2011 | Koehler et al. | |
| 2011/0108322 A1 | 5/2011 | Kaiser | |
| 2011/0153277 A1 | 6/2011 | Morath | |
| 2011/0290030 A1 | 12/2011 | Willner et al. | |
| 2011/0320158 A1 | 12/2011 | Steckenreiter et al. | |
| 2012/0067130 A1 | 3/2012 | Kaiser et al. | |

(56) References Cited

U.S. PATENT DOCUMENTS

| | | |
|---|---|---|
| 2012/0227477 A1 | 9/2012 | Borgers et al. |
| 2013/0052936 A1 | 2/2013 | Jordan |
| 2013/0073189 A1 | 3/2013 | Korenaga et al. |
| 2013/0192379 A1 | 8/2013 | Petrarca |
| 2013/0248024 A1 | 9/2013 | Dunn et al. |
| 2013/0264664 A1 | 10/2013 | Nimura et al. |
| 2013/0336511 A1 | 12/2013 | Underbrink et al. |
| 2014/0130585 A1 | 5/2014 | Borgers et al. |
| 2014/0130586 A1 | 5/2014 | Zwollo et al. |
| 2014/0144206 A1 | 5/2014 | Uehlin et al. |
| 2014/0219713 A1 | 8/2014 | Balsells et al. |
| 2014/0260648 A1 | 9/2014 | Aoyama et al. |
| 2014/0311212 A1* | 10/2014 | Boyd ................. G01N 33/0009 73/23.2 |
| 2014/0338448 A1 | 11/2014 | Ashino |
| 2015/0135853 A1 | 5/2015 | McNeal et al. |
| 2015/0377729 A1 | 12/2015 | Hio et al. |
| 2016/0025581 A1 | 1/2016 | Kazama et al. |
| 2016/0133762 A1 | 5/2016 | Blasco Claret |
| 2016/0202144 A1* | 7/2016 | Oba ................... G01N 27/407 73/114.31 |
| 2016/0202226 A1* | 7/2016 | Yonezu ................ F01N 13/008 73/23.32 |
| 2016/0265998 A1 | 9/2016 | Lavado et al. |
| 2016/0282205 A1 | 9/2016 | Huo et al. |
| 2017/0016849 A1* | 1/2017 | Ohtsuka ............ G01N 27/4076 |
| 2019/0107457 A1* | 4/2019 | Soshino ................ G01L 19/141 |
| 2019/0187017 A1* | 6/2019 | Spanevello ........... G01L 19/142 |

FOREIGN PATENT DOCUMENTS

| | | |
|---|---|---|
| DE | 4407212 C1 | 8/1995 |
| DE | 102004048367 A1 | 4/2006 |
| EP | 085584 A1 | 8/1983 |
| EP | 1074827 A2 | 2/2001 |
| EP | 1211497 A2 | 6/2002 |
| EP | 1560012 A1 | 8/2005 |
| EP | 1826543 A2 | 8/2007 |
| EP | 1921431 | 10/2008 |
| EP | 2390641 A2 | 11/2011 |
| EP | 2620757 A1 | 7/2013 |
| EP | 2848908 A1 | 3/2015 |
| FR | 2791430 A1 | 9/2000 |
| GB | 2066590 A | 7/1981 |
| GB | 2250348 | 6/1992 |
| JP | 406037334 | 2/1994 |
| JP | 2009109313 | 5/2009 |
| JP | 2010256187 A | 11/2010 |
| KR | 20160133227 | 11/2016 |
| WO | WO-0242720 A2 | 5/2002 |
| WO | WO-2003100371 A1 | 12/2003 |
| WO | WO-2006102460 A1 | 9/2006 |
| WO | WO-2011155054 A1 | 12/2011 |
| WO | WO-2013083320 A1 | 6/2013 |
| WO | WO-2013110045 A1 | 7/2013 |
| WO | WO-2014132730 A1 | 9/2014 |

\* cited by examiner

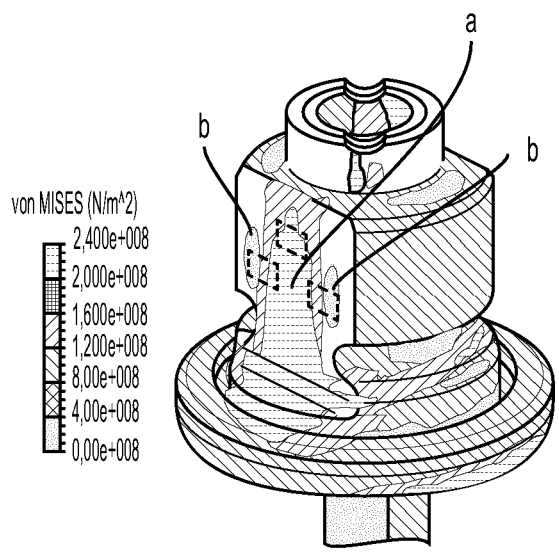
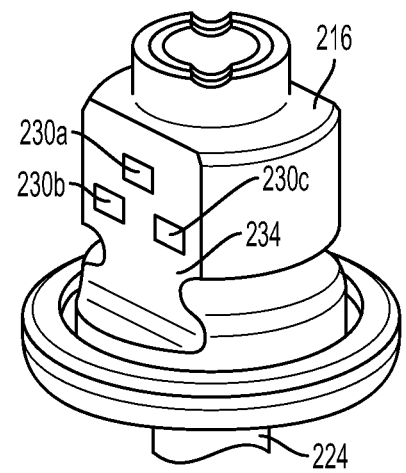
FIG. 8A    FIG. 8B
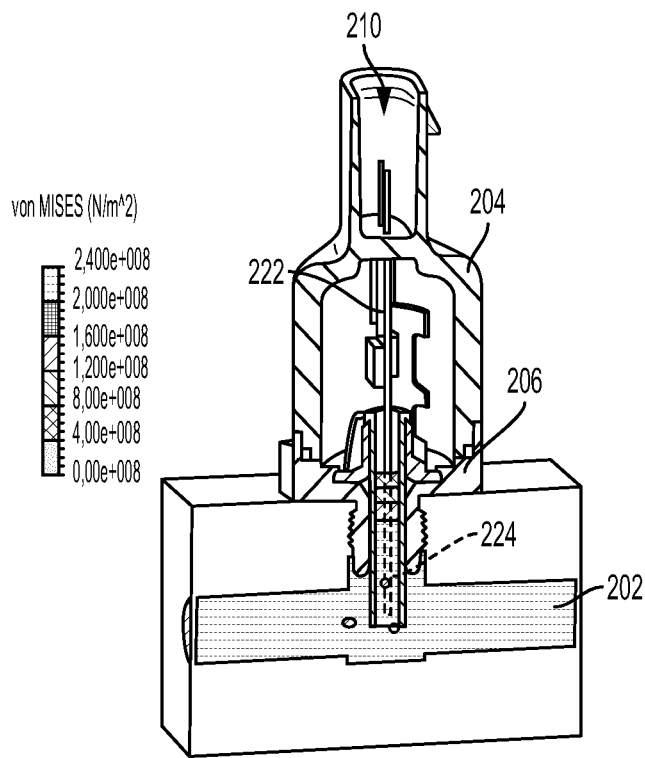
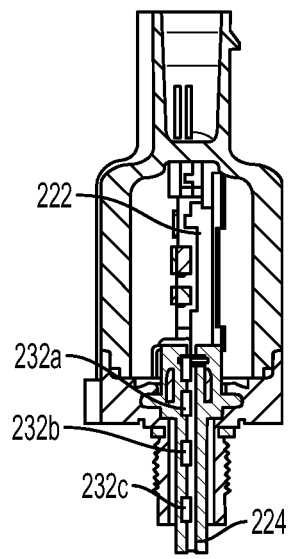
FIG. 9A    FIG. 9B

INTEGRATED PRESSURE AND TEMPERATURE SENSOR

FIELD OF THE INVENTION

The subject disclosure relates to sensors, and more particularly to improved devices for sensing both pressure and temperature.

BACKGROUND OF THE INVENTION

Pressure and temperature sensing technology is being incorporated in an increasing number of applications in a variety of different environments. For example, in the automotive industry, pressure and/or temperature sensors are now incorporated into fuel systems, braking systems, and vehicle stability systems, among many others. As the use of sensing technology becomes more widespread, there is an increasing need for accurate and affordable devices for measuring pressure and temperature. Further, as technology continues to evolve, it is desirable for sensors which are configured to occupy as little space as possible while still being reliable.

SUMMARY OF THE INVENTION

The subject technology overcomes the drawbacks of the prior art by providing a pressure and temperature sensor integrated into a single device which is accurate, affordable, and occupies a limited amount of space.

In at least some embodiments, the subject technology relates to a device for sensing pressure and temperature in a fluid environment. The device has a cover defining an interior, the cover including, within the interior, an annular flange. A port body has an outer annular ring which couples with the annular flange to form a double clinch seal. The double clinch seal hermetically seals the port body to the cover. The port body further has interior walls which surround a thermistor tube to form a channel for receiving a fluid from the fluid environment, the channel extending substantially parallel to a longitudinal axis. At least one diaphragm is affixed within the port body along a plane substantially parallel to the longitudinal axis. Each diaphragm has at least one pressure sensing element coupled to a surface distal to the channel. The device further includes an electronics module assembly with a first end and a second end. The first end is positioned above the thermistor tube along the longitudinal axis and has a plurality of electronic components. The second end is positioned within the thermistor tube and has a plurality of thermistor elements electrically connected to the electronic components. Each thermistor element is calibrated to sense temperature within a different specified range. Each pressure sensing element is calibrated to sense pressure within a different specified range and offset from the electronics module assembly.

In at least some embodiments the subject technology relates to a device for sensing pressure and temperature in a fluid environment with a cover defining an interior. A thermistor tube is at least partially within the interior, the thermistor tube extending substantially along the longitudinal axis. A port body is positioned at least partially within the interior, the port body forming a channel which extends along the longitudinal axis for receiving a fluid from the fluid environment. A first diaphragm is affixed within the port body. The first diaphragm has a first surface exposed to the fluid within the channel and a second surface sealed from the channel. In some embodiments the thermistor tube is offset from the port body and the port body is sealed to the cover via a double clinch seal. In other embodiments the port body has interior walls which surround the thermistor tube with respect to the longitudinal axis and the channel is formed between the port body and the thermistor tube. The first diaphragm then forms a plane substantially parallel to the longitudinal axis.

In some embodiments the device includes a first pressure sensing element coupled to the second surface of the first diaphragm. In some cases the device includes a second pressure sensing element coupled to the second surface of the first diaphragm. In other embodiments, a second diaphragm is affixed within the port body and extends substantially parallel to the longitudinal axis. The second diaphragm can have a first surface exposed to the fluid within the channel and a second surface sealed from channel. A second pressure sensing element can be coupled to the second surface of the second diaphragm. In some embodiments, the pressure sensing elements are each calibrated to sense pressure within a different specified range. The thermistor tube can also include a load bearing flange extending across the channel to contact an upper portion of the port body.

In some embodiments, the device also includes an electronics module assembly extending substantially along the longitudinal axis. The electronics module assembly has a lower end positioned within the thermistor tube and coupled to a thermistor element. The electronics module assembly can include at least one additional lower thermistor element coupled to the lower end of the electronics module assembly within the thermistor tube. In some cases, each additional lower thermistor element is calibrated to sense temperature within a different specified range. The electronics module assembly can also include an upper end positioned above the thermistor tube along the longitudinal axis, the upper end having a plurality of electronic components.

In some embodiments the subject technology relates to a device for sensing pressure and temperature in a fluid environment. The device includes a cover defining an interior which has an annular flange within the interior. A port body with an outer annular ring is positioned within the interior. The outer annular ring couples with the annular flange to form a mechanical seal, sealing the port body to the cover. In at least one embodiment the mechanical seal is a double clinch seal. A thermistor tube can be positioned within the interior and have an open top portion and a closed bottom portion. A channel can be formed between the thermistor tube and the cover for receiving a fluid from the fluid environment.

In some embodiments, the device includes an electronics module assembly. The electronics module assembly has a lower end positioned within the thermistor tube and having a plurality of lower electronic components. The electronics module assembly also has a central portion extending through the open top portion of the thermistor tube. Finally, a top portion of the electronics module assembly is positioned above the thermistor tube and has a plurality of upper electronic components. The lower end of the electronics module assembly can have a plurality of thermistor elements. In some embodiments, the lower end electronic components include signal conditioning electronics. The device can include a diaphragm affixed within the port body and forming a plane substantially parallel to the channel. The diaphragm can be configured to flex in response to a pressure from the fluid. Further, a pressure sensing element can be coupled to a surface of the diaphragm for sensing pressure in the fluid environment based on the flexure of the diaphragm.

BRIEF DESCRIPTION OF THE DRAWINGS

So that those having ordinary skill in the art to which the disclosed system pertains will more readily understand how to make and use the same, reference may be had to the following drawings.

FIG. 8A is a perspective view of an integrated pressure and temperature sensor in accordance with the subject technology showing a stress profile.

FIG. 8B is a perspective view of an embodiment of an integrated pressure and temperature sensor in accordance with the subject technology.

FIG. 9A is a perspective view of an integrated pressure and temperature sensor in accordance with the subject technology showing a temperature profile.

FIG. 9B is a perspective view of an embodiment of an integrated pressure and temperature sensor in accordance with the subject technology.

DETAILED DESCRIPTION OF PREFERRED EMBODIMENT

Figure 1:
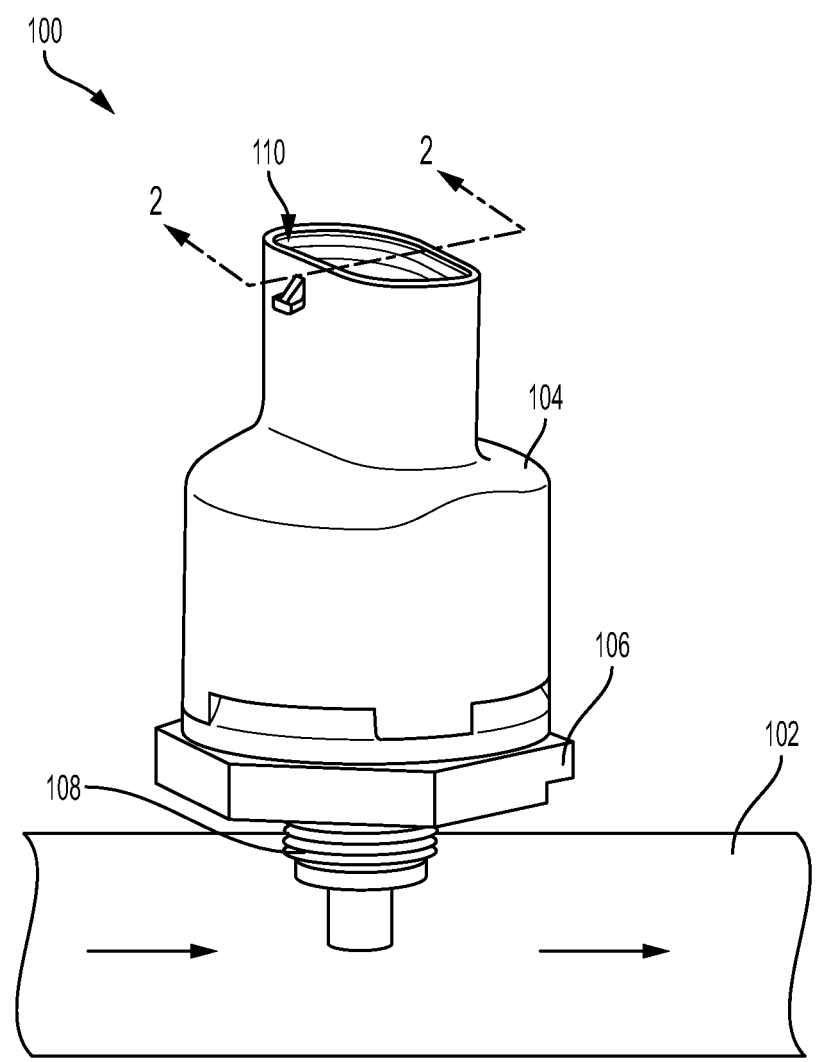
FIG. 1 is a perspective view of an integrated pressure and temperature sensor in accordance with the subject technology.

The subject technology overcomes many of the prior art problems associated with sensors. The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts.

Referring now to FIG. 1, an integrated pressure and temperature sensing device in accordance with the subject technology is shown generally at 100. The device 100 contains components for sensing a pressure within a fluid environment 102, as discussed more fully herein. The device 100 has a housing 104 and cover 106 which detachably join together to enclose the inner components. The cover 106 has a threaded bottom section 10 which allows it to be securely fastened within the fluid environment 102. The housing 104 contains an upper outlet 110 which can receive a connector to put the inner components in electrical connection with external devices.

Figure 2:
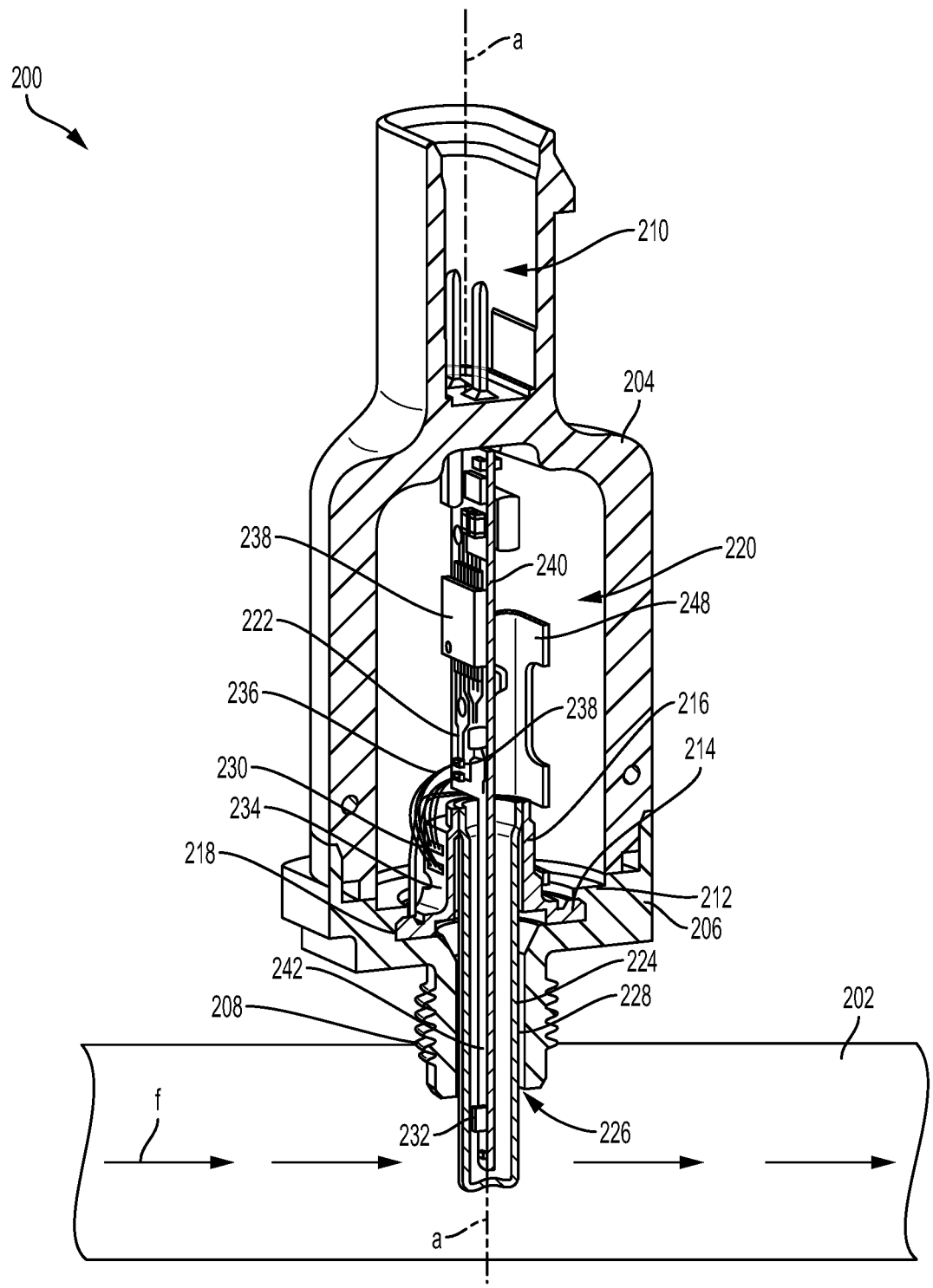
FIG. 2 is a cross sectional perspective view of an integrated pressure and temperature sensor in accordance with the subject technology.
Figure 3:
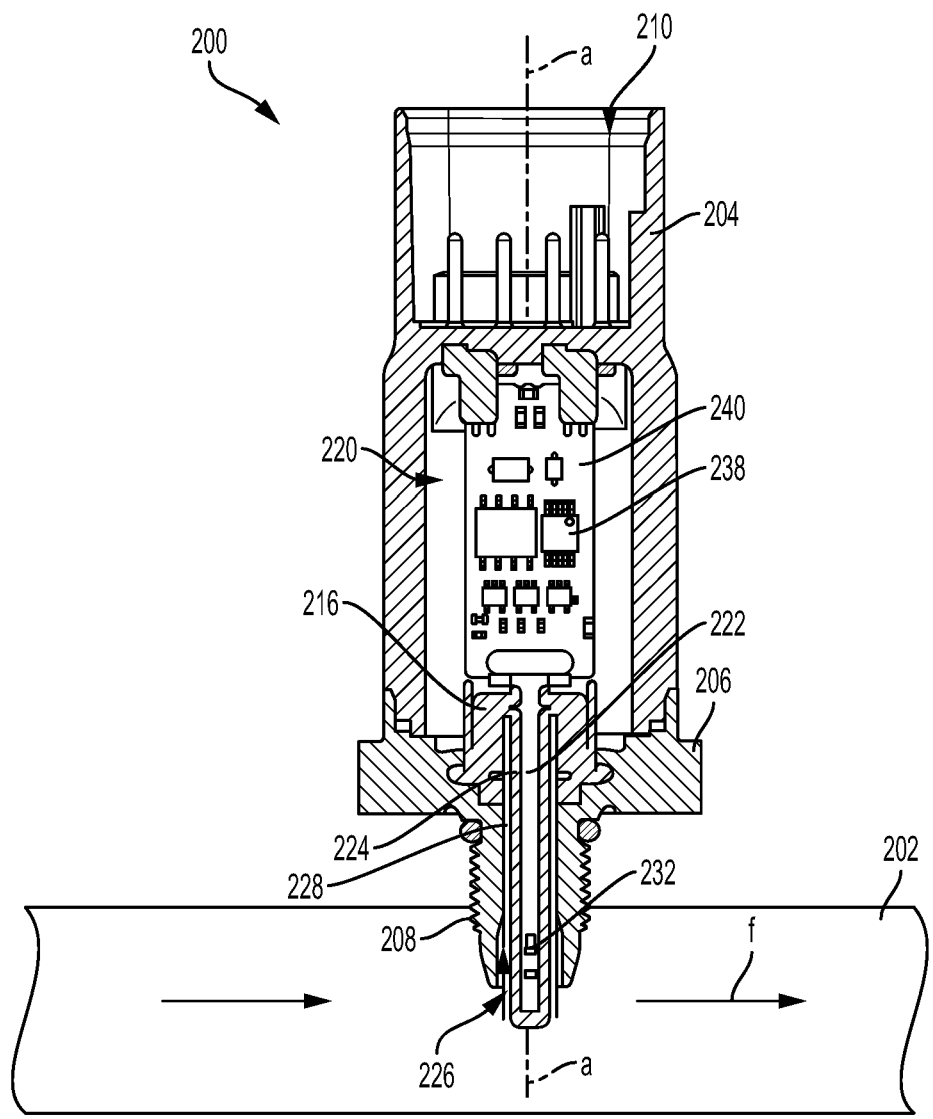
FIG. 3 is a cross sectional front view of an integrated pressure and temperature sensor in accordance with the subject technology.

Referring now to FIGS. 2-3, a cross sectional view of an integrated pressure and temperature sensor is shown generally at 200. As shown, the cover 206 securely holds the device 200 within the fluid environment 208. A channel 226 for receiving a fluid 228 from the fluid environment 202 is defined between a thermistor tube 224, a port body 216, and the cover 206. In general, the port body 216 includes sensing elements 230 for sensing pressure while the thermistor tube 224 contains thermistor elements 232 for sensing temperature. The channel 226 extends along the longitudinal axis "a", allowing for the receipt of fluid laterally with respect to the flow "f" of the fluid environment 202.

The cover 206 defines an interior within which it has an inner annular flange 212. The inner annular flange 212 couples with an outer annular ring 214 of a port body 216 to form a mechanical seal 218, thereby sealing the cover 206 to the port body 214. In the embodiment shown, the mechanical seal 218 is a double crimp seal. The seal 218 prevents fluid 228 from entering a cavity 220 defined by the housing 204 and the cover 206 within which an electronics module assembly 222 is seated. The electronics module assembly 222 is also affixed to the housing 206 and the port body 216 by a support member 248 for stability.

Still referring to FIGS. 2-3, in the embodiment shown, thermistor elements 232 track temperature as the fluid 228 in the channel 226 contacts the thermistor tube 224. While only one thermistor element 232 is shown in the present example, it should be noted that multiple thermistor elements 232 can be used near different locations within the thermistor tube 224 to track temperature within different ranges, as discussed more fully herein. Generally the thermistor elements 232 are positioned somewhere along the lower portion 242 electronics module assembly 222 which is contained within the thermistor tube 224. The thermistor elements 232 are in electrical communication with the electrical components 238 on the upper portion 240 of the electronics module assembly 222. For example, the thermistor elements 232 can be connected to the electrical components 238 by interconnects (not shown herein).

Similarly, but for pressure, two sensing elements 230 are affixed on flexible portion of the port body 216. More particularly, the port body 216 has a sidewall 234 with one or more areas having a lessened width, as compared to the rest of the port body 216. The inner surface of the sidewall 234 is exposed to fluid 228 within the channel 226. This allows one or more areas of the sidewall 234 to flex depending on the pressure in the fluid environment 202. For example, the sidewall 234 may contain multiple thin, flexible areas, acting as individual diaphragms and positioned under each sensing element 230. Alternatively, the entire sidewall 234 may serve as a diaphragm and one or more sensing elements 230 may be positioned at different locations on the sidewall 234. In general, the sensing elements 230 are affixed to outer surfaces of the sidewall 234, or diaphragms, thereby limiting or eliminating physical contact between the sensing elements 230 and the fluid 228 (notably, the terms "sidewall" and "diaphragm" are used interchangeably herein to denote the flexible portion of the port body 216). The sensing elements 230 transmit a signal, via interconnects 236 to electric components 238 on the upper portion 240 of the electronics module assembly 222. The combination of the housing 204, cover 206, and port body 216 keep the sensing elements 230 isolated from the fluid 228 within the channel 226.

In the embodiment shown, the sidewall 234 and the sensing elements 230, are positioned along a plane parallel to the longitudinal axis "a" (and thus, parallel to the channel 226). By positioning the sidewall 234, and thus the sensing elements 230, along a plane parallel to the fluid channel "a", the sensing elements 230 can be calibrated to correspond with the various magnitudes of pressure felt at different locations of the sidewall 234, as discussed more fully herein. Further, by orienting many the components laterally (i.e. the electronics module assembly 222, the thermistor tube 224, the sidewall 234), along the longitudinal axis "a", the width of the device 200 is reduced while accuracy is still preserved. Notably, while two sensing elements 230 are shown, various amounts of sensing elements 230 can be used, such as one, three, four, or more, depending on the desired application, as discussed in more detail below.

Figure 4:
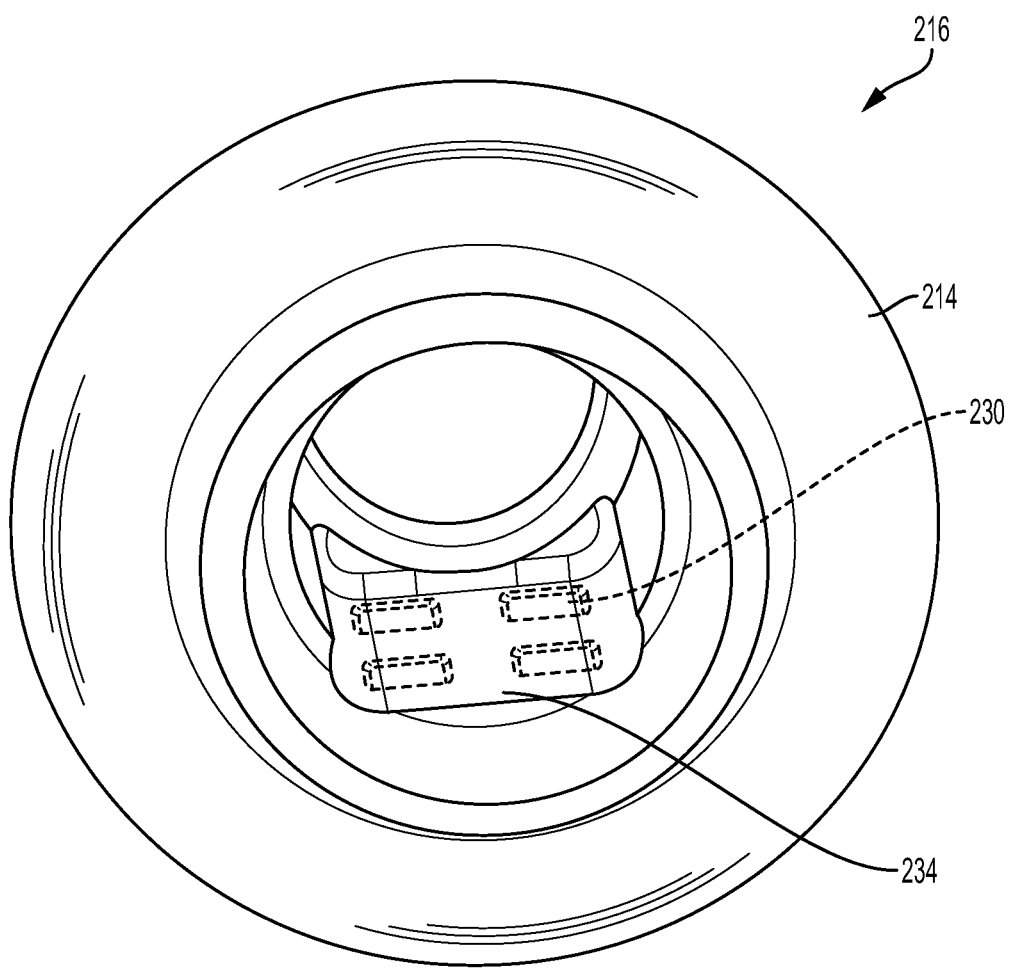
FIG. 4 is a perspective view of the interior of a port body in accordance with the subject technology.

Referring now to FIG. 4, a bottom perspective view of a port body 216 is shown. Sensing elements 230, shown in phantom, are affixed to the exterior of the sidewall 234. When the port body 216 is incorporated with the rest of the device 200 and used in practice, it is expected that the sidewall 234 will be parallel and adjacent to the fluid channel 226. Therefore the sidewall 234, being parallel to the fluid channel 226, flexes perpendicularly to the flow of fluid 228 through the fluid channel 226. The sensing elements 230 can be anything designed to sense pressure in response to the flexure of a surface. For example the sensing elements 230 can be strain gauges with piezoresistors. As the sidewall 234 flexes, the resistance of the resistors changes in response to the flexure. The resistance of the strain gauge 230 can be measured, for example, by arranging one or more Wheatstone bridges to measure the change in resistance of piezoresistors within each sensing element 230. Based on the resistance of the piezoresistors within the sensing element 230, the flexure of a location of the sidewall 234, and thus the pressure of the fluid in the pressure environment 202, can be determined. The resistance can be communicated to the electronics 238 by the interconnects 236.

Figure 5:
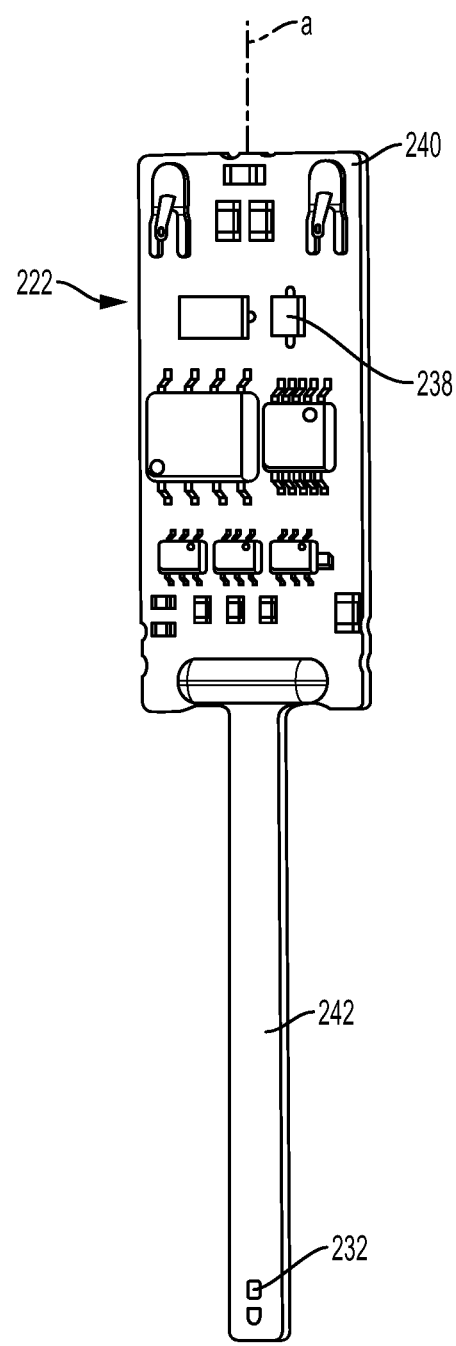
FIG. 5 is a perspective view of an electronics module assembly in accordance with the subject technology.

Referring now to FIG. 5, an electronics module assembly in accordance with the subject technology as shown generally at 222. A lower thermistor element 232 that is positioned on the bottom portion 242 is in electrical communication with electronics 238 on the top portion 240. In general, the electronics module assembly 222 is incorporated in the device so that the assembly 222 runs along the longitudinal axis "a" with the bottom portion 242 extending through the thermistor tube 224 and the top portion 240 seated above the thermistor tube 224 within the interior of the housing 204 (See FIGS. 2-3). The electronics 238 can include components for storing, interpreting, modifying, and/or transmitting signals from various other components such as the sensing elements 230 and thermistor elements 232. For example, upper electronic components 238 can include a number of bonding pads, signal processing or transmitting equipment, or one or more application specific integrated circuits. A signal from the electronics 238 can be transmitted to external devices by various means such as a wireless signal or a hardwire connection via the upper outlet 210.

Figure 6A:
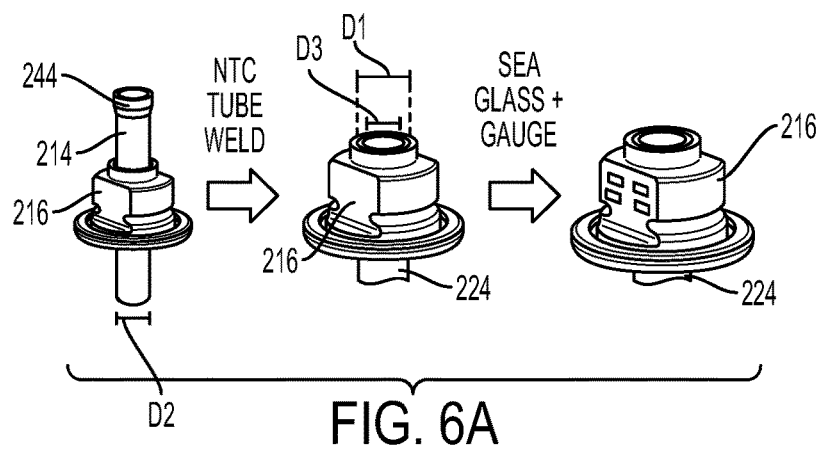
FIGS. 6A-6E show a method of assembling an integrated pressure and temperature sensor in accordance with the subject technology.

Referring now to FIGS. 6A-6E, a method of assembling an integrated pressure and temperature sensor 200 in accordance with the subject technology is shown. Referring to FIG. 6A, the thermistor tube 224 slides into an upper opening of the port body 216. The channel 226 is partially formed between the larger inner diameter "D1" of the port body 216 and the smaller outer diameter "D2" of the thermistor tube 216. The thermistor tube 224 has an upper portion 244 with an outer diameter "D3" that is only slightly smaller than the inner diameter D1 of the port body. Therefore the upper portion of the thermistor tube 224 sits tightly within the port body 216 and the two parts can be welded together near the top for permanent coupling.

Figure 6B:
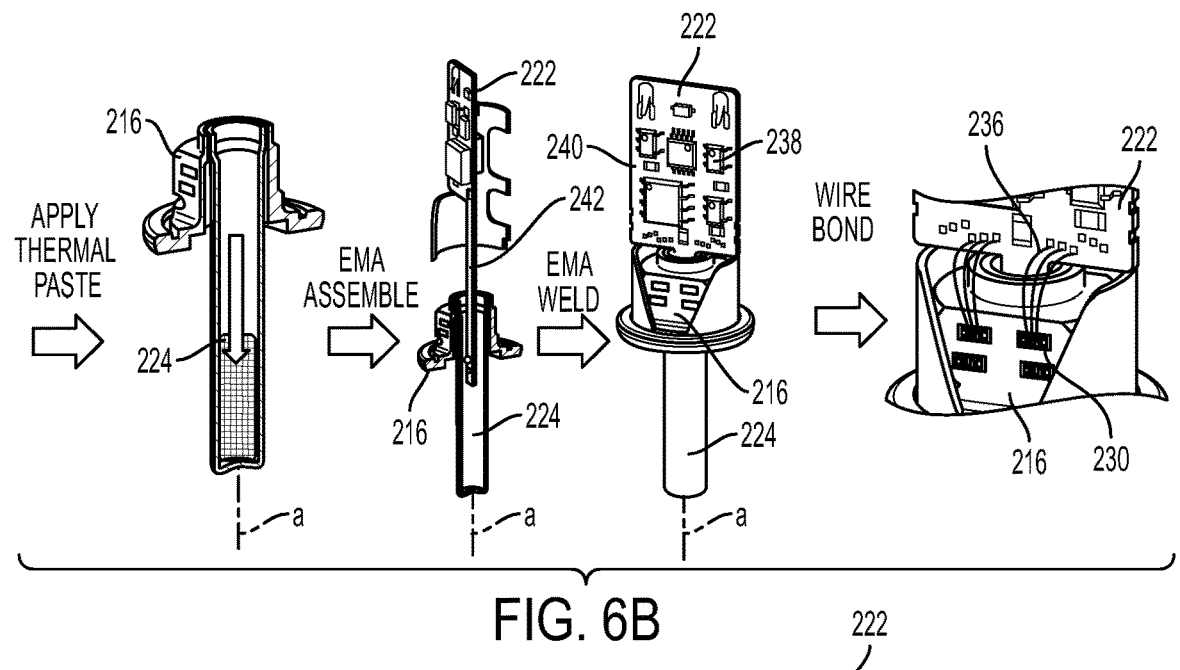
Figure 6C:
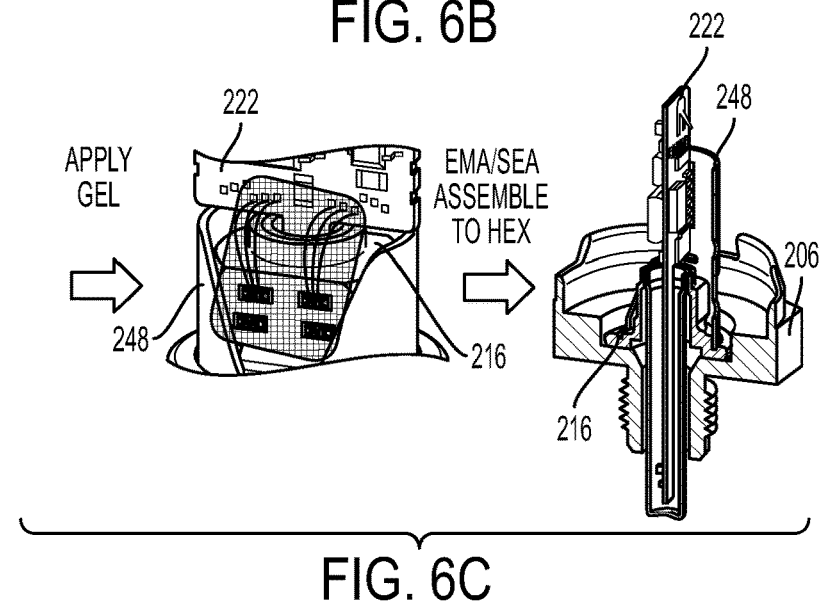

Referring now to FIG. 6B, the electronics module assembly 222 is then attached to other components of the device 200. The electronics module assembly 222 is pre-fitted with desired components before it is coupled to the rest of the device 200. For example, the lower portion 242 of the electronics module assembly 222 can include a thermistor element 232 which is electrically coupled to electronic components 238 on the upper portion 240 of the electronics module assembly 222. A thermal paste is then applied within the thermistor tube 224. The electronics module assembly 222 is then slid along the longitudinal axis "a" with the lower end 242 of the electronics module assembly 222 entering the open top portion of thermistor tube 224. The sensing elements 230 can then be connected to the bonding pads (part of electronics 238) on the electronic module assembly 222. Referring now to FIG. 6C, the electronics module assembly is also mechanically attached to a support member 248 which is attached to the housing 206 and/or port body 216 to hold the electronics module assembly 222 in place.

Figure 6D:
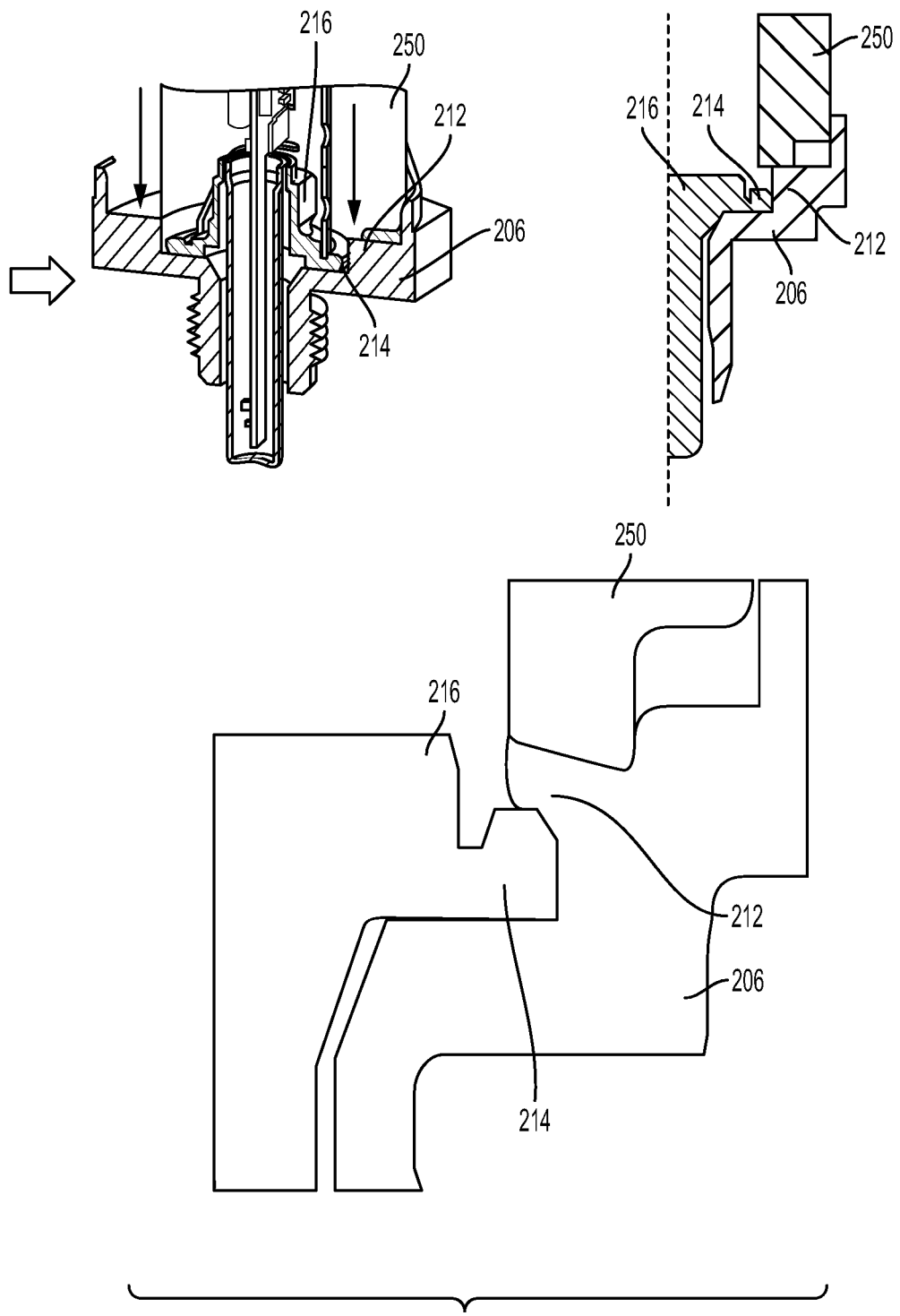

Referring now to FIG. 6D, a seal 218 (i.e. a "double crimp" or "double clinch" as seen in FIGS. 2-3) is formed between the port body 216 and the cover 206. To create this seal 218, the port body 216 is positioned within the interior of the cover 206 with the annular ring 214 of the port body 216 sitting against the annular flange 212 of the cover 206. The cover 206 is formed from a material which is easier to deform than the material of the port body 216. For example, the cover 206 may be aluminum while the port body 216 is steel. A clinching member 250 is then positioned over the top surface of the annular flange 212. As the clinching member 250 is pushed downwards, the upper surface of the annular flange 212 is forced inwards, folding over the upper surface of the annular ring 214. In this way, the annular flange 212 of the cover 206 folds over the annular ring 214 of the port body 216 such that the annular flange 212 is sealed to both the top surface and bottom surface of the annular ring 214 to form a double clinch seal 218. The double clinch seal 218 is a hermetic seal which prevents fluid 228 in the channel 226 from leaking between the port body 216 and cover 206 into the cavity 220.

Figure 6E:
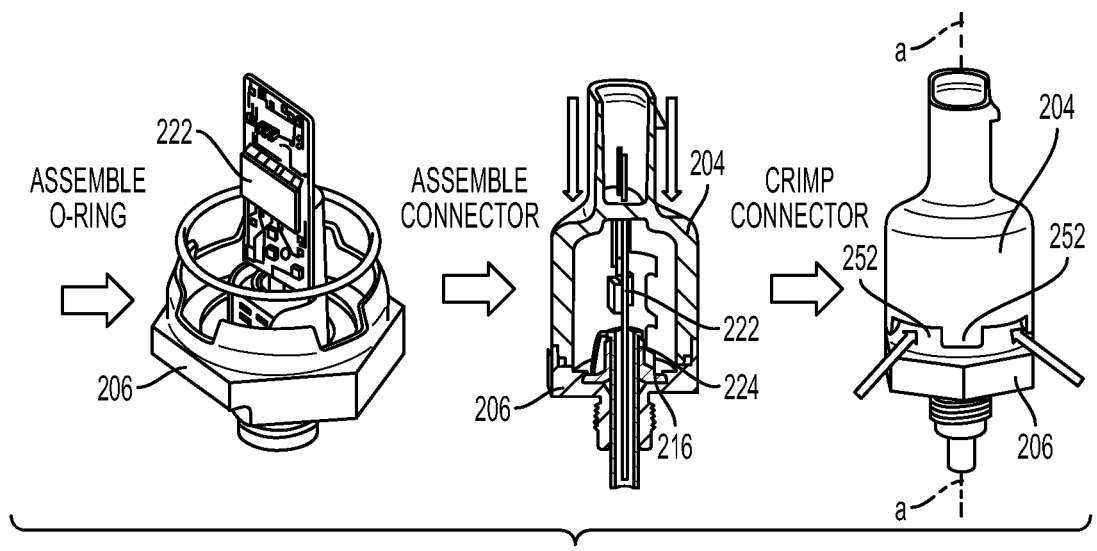

Referring now to FIG. 6E, the housing 204 is then affixed to the device 200 to completely seal the inner cavity 220. The lower surface of the housing 204 and the upper surface of the cover 206 have alternating teeth 252 which extend around the longitudinal axis "a". To seal the cover 206 and housing 204, the housing 204 is pressed down the longitudinal axis "a" and the lower surface of the housing 204 forms a crimp with the upper surface of the cover 206. The teeth 252 interlock and the inner cavity 220 between the housing 204 and cover 206 is sealed.

Figure 7:
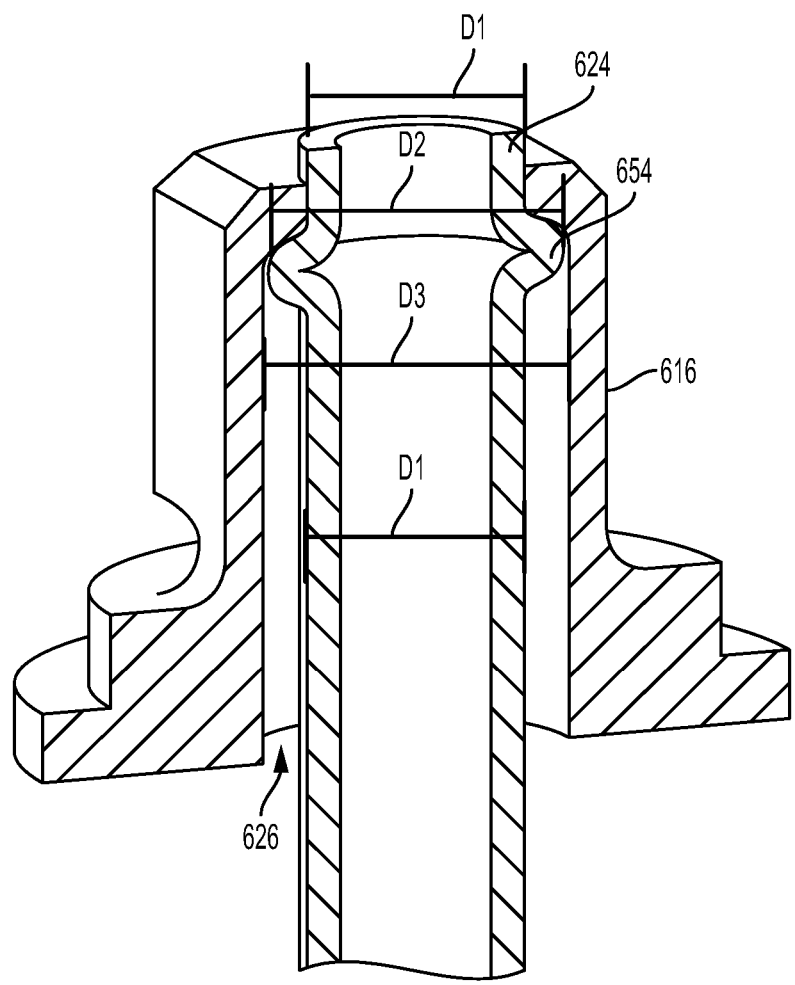
FIG. 7 is a cross sectional view of an integrated pressure and temperature sensor using a load flange in accordance with the subject technology.

Referring now to FIG. 7, an embodiment of a thermistor tube 624 with a load flange 654 is shown. Unlike the other embodiments shown here, the upper portion of the thermistor tube 624 generally has a diameter "D1" that is substantially the same as the central portion of the thermistor tube. However, slightly below the upper opening of the thermistor tube 624, a wider load flange 654 (having diameter "D2") is formed. The port body 616 necks inwards, at its upper end, to from a wide inner diameter"D3" to a diameter that is only slight larger than D1, allowing the port body 616 to fit snugly against, and be welded to, the upper portion of the thermistor tube 624. The wider load flange 654 creates a pressure cavity where fluid flowing into the channel 626 applies an upwards force to the load flange 654 of the thermistor tube 624 such that the thermistor tube 624 is pressed more tightly against the port body 616. In this way, the load flange 654 reacts to increased pressure in the fluid channel 626 by sealing the thermistor tube 624 even more tightly to the port body 616.

Referring now to FIGS. 8A and 8B, in some embodiments, the device 200 is designed to include more than one sensing element 230, each being calibrated to sense pressure within a different range. The locations, and calibrated ranges of sensing elements 230, can be based on a stress profile which describes the magnitude of stress on the port body 216 created by the fluid 228. For example, in FIG. 8A, the stress profile shows a first location "a" along the center of the sidewall 234 of the port body 216 that experiences a high degree of stress compared to the rest of the side wall 234. By contrast, areas to the sides of the sidewall 234 "b" show lower stress. Thus, the design results in a configuration where the sidewall 234 can serve the role of multiple diaphragms above areas of varying pressure (or a single diaphragm over areas of varying pressure).

Turning to FIG. 8B, three sensing elements 230 are mounted to the sidewall 234. The first sensing element, 230a, is mounted at the first location "a" and experiences the most flexure. At location "a", a very small change in fluid pressure may cause flexure in the sidewall 234 and may affect the resistance of the first sensing element 230a. As a result, the first sensing element 230a is calibrated to focus in on a narrower pressure range which relates to expected operating ranges or critical values depending on the application of the fluid 202 being measured. On the other hand, the other sensing elements 230b, 230c are mounted at least partially above location "b" which experiences less flexure in response to pressure from the fluid 202. Therefore piezoresistors of the other sensing elements 230b, 230c can be positioned about this area of lower flexure (for the present example, this is assumed to be the case). The sensing elements 230b, 230c are then calibrated for different ranges of pressure. This can be beneficial to reach a wider pressure range or to provide redundancy in conjunction with other pressure sensing elements 230. It is also possible to use sensing elements 230b, 230c at the second location "b" when a user desires to avoid sharp jumps in perceived pressure as a result of small surges which are not representative of actual pressure in the fluid environment 202. Notably, this embodiment is provided only in way of example. In other embodiments, more or fewer sensing elements 230 can be provided. In some cases the sensing elements 230 may be specifically positioned and calibrated depending on a stress profile. In other cases, multiple sensing elements 230 may be calibrated to the same or overlapping ranges simply to provide redundancy and ensure accuracy.

Similarly, referring now to FIGS. 9A-9B, in some embodiments, the device 200 is designed to include more than one thermistor element 232, each thermistor element 232 being calibrated to sense temperature within a different range. The use of multiple thermistor elements 232 in multiple locations is similar to the use of multiple sensing elements 230, as described above, except that the thermistor elements 232 sense temperature. The locations, and calibrated ranges of the thermistor elements 232, can be based on a temperature profile (i.e. FIG. 9A) which describes the temperature felt by various portions of the thermistor tube 224 as a result of the fluid temperature. For example, in the embodiment shown, the thermistor element 232c is positioned closest to the fluid environment 202 (where temperature is at its highest) and can be calibrated to focus on a specific temperature range in an expected or critical operating range. On the other hand, thermistor element 232a experiences the least change in temperature and may be calibrated to sense a much wider range, or provide redundancy from a location less susceptible to quick, non-representative changes in temperature felt by the thermistor tube 224. Similarly, in some cases, multiple thermistor elements 232 are provided in similar areas of the temperature profile for accuracy or redundancy.

Figure 10:
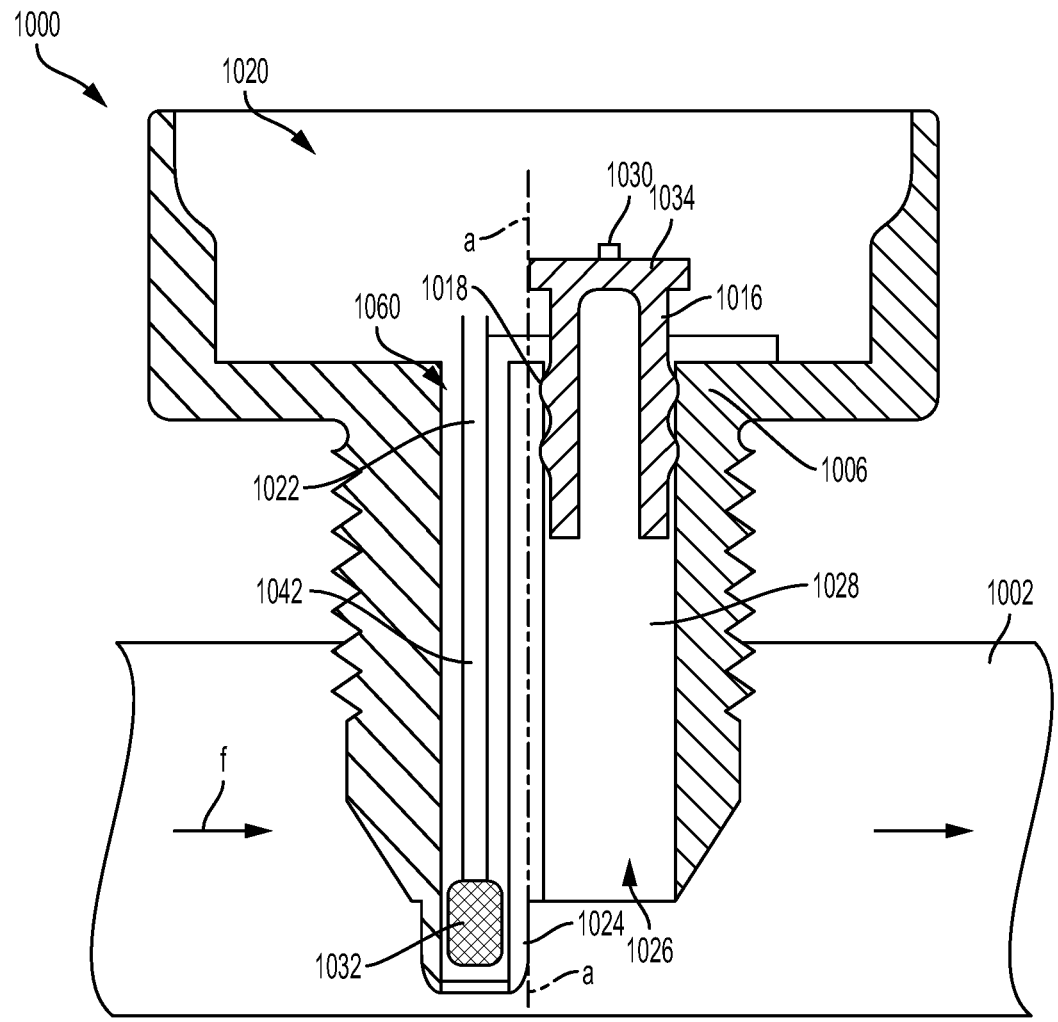
FIG. 10 is a cross sectional view of another embodiment of an integrated pressure and temperature sensor in accordance with the subject technology.

Referring now to FIG. 10, another embodiment of an integrated pressure and temperature sensing device is shown generally at 1000. Unlike the embodiment shown in FIG. 2, the device 1000 has a port body 1016 that is offset from the thermistor tube 1024. Instead the cover 1006 forms two separate channels 1026, 1060 along the longitudinal axis "a". The lower portion of the electronics module assembly 1042 is inserted into the first channel 1060, the bottom of which is seated directly within the flow "f" of fluid in the fluid environment 1002. The second channel 1026 is open to the fluid environment 1002 to allow an inflow of fluid. A port body 1016 is affixed within the second channel 1026, and forms a double clinch seal 1018 with the inner walls of the cover 1006. The port body 1016 receives a fluid 1028 through the channel 1026 and directs it to a sidewall 1034. The sidewall 1034 functions as a diaphragm, much like the other sidewalls 234 shown herein, except that the sidewall 1034 runs along a plane perpendicular to the longitudinal axis "a". A pressure sensing element 1030 senses flexure of the sidewall 1034 and connects to the electronics (not shown) on the upper portion of the electronics module assembly 1022. Similar to the other embodiments, a housing 204 attaches to the cover 1006 to seal the inner cavity 1020. The device 1000 functions similar to other embodiments of the subject technology, except for the differences resulting from the different orientation of the device, as described and shown.

It will be appreciated by those of ordinary skill in the pertinent art that the functions of several elements may, in alternative embodiments, be carried out by fewer elements, or a single element. Similarly, in some embodiments, any functional element may perform fewer, or different, operations than those described with respect to the illustrated embodiment.

Also, functional elements (e.g., electronics, pressure sensing elements, temperature sensing elements, and the like) shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

The invention claimed is:

1. A device for sensing pressure and temperature in a fluid environment comprising:
   a cover defining an interior, the cover including, within the interior, an annular flange;
   a port body having: an outer annular ring coupling with the annular flange to form a double clinch seal; and interior walls which surround a thermistor tube to form a channel for receiving a fluid from the fluid environment, the channel extending substantially parallel to a longitudinal axis;
   at least one diaphragm affixed within the port body along a plane substantially parallel to the longitudinal axis, each of the diaphragms having at least one pressure sensing element coupled to a surface distal to the channel; and an electronics module assembly having a first end and a second end, the first end positioned above the thermistor tube along the longitudinal axis and having a plurality of electronic components, the second end positioned within the thermistor tube and having a plurality of thermistor elements electrically connected to the electronic components, wherein:

the thermistor elements are each calibrated to sense temperature within a different specified range;

the pressure sensing elements are each: calibrated to sense pressure within a different specified range; and offset from the electronics module assembly; and the double clinch seal hermetically seals the port body to the cover.

2. A device for sensing pressure and temperature in a fluid environment comprising:

a cover defining an interior;

a thermistor tube at least partially within the interior, the thermistor tube extending substantially along a longitudinal axis;

a port body at least partially within the interior, the port body having interior walls which surround the thermistor tube with respect to the longitudinal axis forming a channel between the port body and the thermistor tube which extends along the longitudinal axis for receiving a fluid from the fluid environment;

a first diaphragm affixed within the interior walls of the port body and forming a plane substantially parallel to the longitudinal axis, the first diaphragm having: a first surface exposed to the fluid within the channel; and a second surface sealed from the channel;

a first pressure sensing element coupled to the second surface of the first diaphragm;

a second diaphragm affixed within the port body and extending substantially parallel to the longitudinal axis, the second diaphragm having: a first surface exposed to the fluid within the channel; and a second surface sealed from channel; and a second pressure sensing element coupled to the second surface of the second diaphragm, wherein the thermistor tube has at least one thermistor element positioned within the channel.

3. The device of claim 2 wherein the pressure sensing elements are each calibrated to sense pressure within a different specified range.

4. The device of claim 2 wherein the thermistor tube includes a load bearing flange extending across the channel to contact an upper portion of the port body.

5. The device of claim 2 further comprising:

an electronics module assembly extending substantially along the longitudinal axis, the electronics module assembly having a lower end: positioned within the thermistor tube; and coupled to the at least one thermistor element.

6. The device of claim 5 wherein the electronics module assembly includes at least one additional lower thermistor element coupled to the lower end of the electronics module assembly within the thermistor tube.

7. The device of claim 6 wherein each additional lower thermistor element is calibrated to sense temperature within a different specified range.

8. A device for sensing pressure and temperature in a fluid environment comprising:

a cover defining an interior;

a thermistor tube at least partially within the interior, the thermistor tube extending substantially along a longitudinal axis;

a port body at least partially within the interior, the port body having interior walls which surround the thermistor tube with respect to the longitudinal axis forming a channel between the port body and the thermistor tube which extends along the longitudinal axis for receiving a fluid from the fluid environment;

a first diaphragm affixed within the interior walls of the port body and forming a plane substantially parallel to the longitudinal axis, the first diaphragm having: a first surface exposed to the fluid within the channel; and a second surface sealed from the channel; and an electronics module assembly extending substantially along the longitudinal axis, the electronics module assembly having a lower end: positioned within the thermistor tube; and coupled to the at least one thermistor element, wherein:

the thermistor tube has at least one thermistor element positioned within the channel; and the electronics module assembly includes at least one additional lower thermistor element coupled to the lower end of the electronics module assembly within the thermistor tube.

9. A device for sensing pressure and temperature in a fluid environment, the device comprising:

a cover defining an interior, the cover including, within the interior, an annular flange;

a port body positioned within the interior and having an outer annular ring, the outer annular ring coupling with the annular flange to form a mechanical seal, wherein the mechanical seal is a double clinch seal that seals the port body to the cover;

a thermistor element in the interior for measuring temperature; and a pressure sensing element coupled to the port body.

10. The device of claim 9 further comprising:

a thermistor tube, positioned within the interior and having an open top portion and a closed bottom portion; and a channel, formed between the thermistor tube and the cover, for receiving a fluid from the fluid environment.

11. The device of claim 10 further comprising:

an electronics module assembly having: a lower end positioned within the thermistor tube and having a plurality of lower electronic components; a central portion extending through the open top portion of the thermistor tube; and a top portion positioned above the thermistor tube and having a plurality of upper electronic components.

12. The device of claim 11 wherein the lower end of the electronics module assembly includes a plurality of thermistor elements.

13. The device of claim 12 wherein lower end electronic components include signal conditioning electronics.

14. The device of claim 10 further comprising:

a diaphragm affixed within the port body and forming a plane substantially parallel to the channel, the diaphragm configured to flex in response to a pressure from the fluid; and the pressure sensing element, the pressure sensing element coupled to a surface of the diaphragm for sensing pressure in the fluid environment based on the flexure of the diaphragm.

15. The device of claim 2, wherein the thermistor tube is positioned centrally within the channel.

16. The device of claim 2, wherein the thermistor tube has an outer diameter that is smaller than an inner diameter of the port body and the channel is formed between the outer diameter of the thermistor tube and the inner diameter of the port body.

17. The device of claim 8 wherein the electronics module assembly includes an upper end positioned above the thermistor tube along the longitudinal axis, the upper end having a plurality of electronic components.

18. The device of claim 8 wherein each additional lower thermistor element is calibrated to sense temperature within a different specified range.

19. A device for sensing pressure and temperature in a fluid environment comprising:

a cover defining an interior;

a thermistor tube at least partially within the interior, the thermistor tube extending substantially along a longitudinal axis;

a port body at least partially within the interior, the port body having interior walls which surround the thermistor tube with respect to the longitudinal axis forming a channel between the port body and the thermistor tube which extends along the longitudinal axis for receiving a fluid from the fluid environment; and a first diaphragm affixed within the interior walls of the port body and forming a plane substantially parallel to the longitudinal axis, the first diaphragm having: a first surface exposed to the fluid within the channel; and a second surface sealed from the channel, wherein: the thermistor tube has at least one thermistor element positioned within the channel; and the thermistor tube includes a load bearing flange extending across the channel to contact an upper portion of the port body.

* * * * *